UNITED STATES PATENT OFFICE.

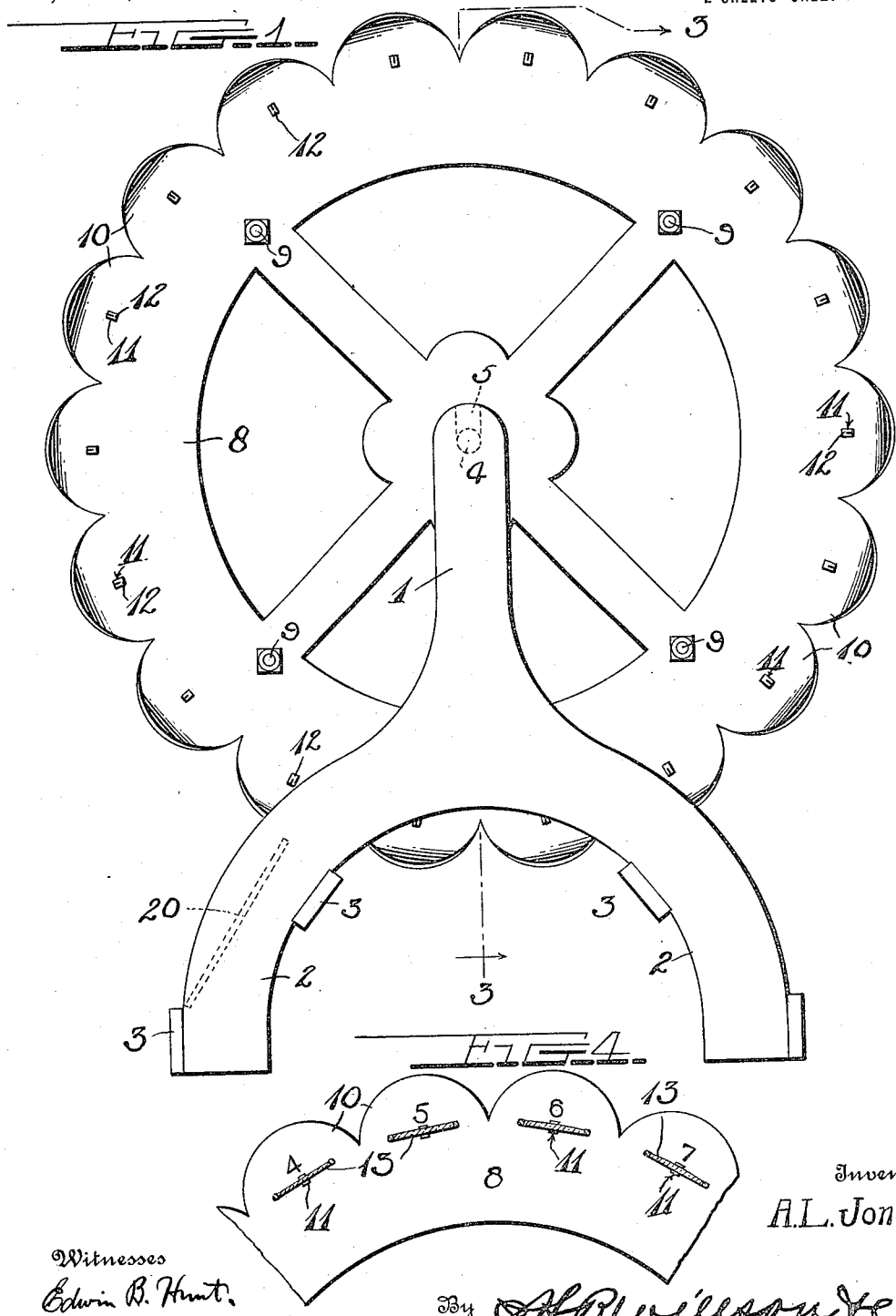

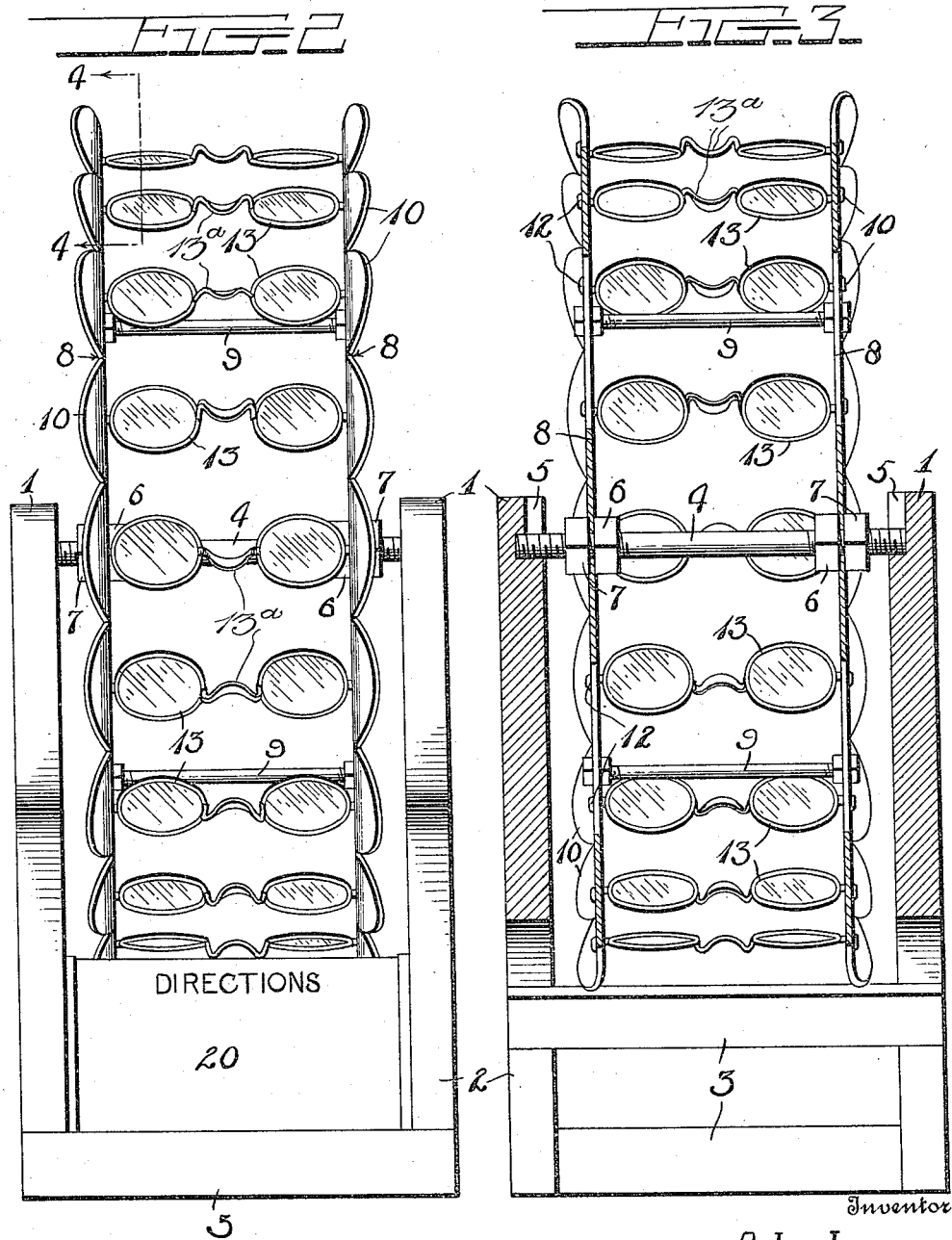

AARON LEROY JONES, OF BROWNWOOD, TEXAS.

EYE-TESTING DEVICE.

1,162,489.  Specification of Letters Patent.  Patented Nov. 30, 1915.

Application filed February 18, 1915. Serial No. 9,067.

*To all whom it may concern:*

Be it known that I, AARON L. JONES, a citizen of the United States, residing at Brownwood, in the county of Brown and State of Texas, have invented certain new and useful Improvements in Eye-Testing Devices; and I do declare the following to be a full, clear, and exact description of the invention, such as will enable others skilled in the art to which it appertains to make and use the same.

My invention relates to improvements in eye testing devices and has for its main object to provide such an article by the use of which, the purchasers of eye-glasses and spectacles may test their own eyes to ascertain the character of lenses necessary.

To the above end, the invention further aims to provide such a device which will present a neat and attractive appearance and which will effectively display duplicates of the articles to be sold.

With the above objects in view, the invention resides in certain novel features of construction and combination hereinafter more fully described and claimed and shown in the drawings wherein :—

Figure 1 is a side elevation of an eye testing device constructed in accordance with the invention; Fig. 2 is a front view thereof; Fig. 3 is a vertical transverse section taken along the plane of the line 3—3 of Fig. 1; Fig. 4 is a detail vertical longitudinal section as seen along the plane of the line 4—4 of Fig. 2.

In these drawings, constituting a part of the present application, the numerals 1 designate a pair of spaced upright standards whose lower ends are forked as seen at 2 to provide pedestals, such pedestals being connected by transverse bars or strips 3 which are disposed at appropriate intervals. Extending transversely from the top of one standard 1 to the top of the other standard, is a horizontal shaft 4 whose ends are revolubly mounted in appropriate bearings or notches 5 formed at the inner upper corners of said standards.

The opposite end portions of the shaft 4 are here shown as threaded and as provided with a pair of spaced nuts 6 and with a second pair of such nuts 7, the nuts 7 being spaced outwardly slight distances from the nuts 6 as most clearly seen in Fig. 3. Clamped between the nuts 6 and 7 at each end of the shaft 4, is a supporting wheel 8, two wheels being therefore provided. These two wheels are here shown of ornamental design, as being axially alined and, due to the spaced relation of the various nuts, they are spaced longitudinally upon the shaft 4, in which position, their outer edge portions are retained by a plurality of circumferentially spaced stay bolts 9 likewise having inner and outer nuts contacting respectively with the inner and outer sides of said wheels. It is obvious that by adjusting the nuts on the stay bolts, circumferentially spaced portions of the wheels or disks 8 may be spaced unequal distances from each other to compensate for eye glasses having frames of different length.

As most clearly seen in Figs. 1 and 2, the outer edges of the two wheels are scalloped as shown at 10, and the individual scallops are curved outwardly, thus providing members to engage the forehead of the person using the device, in a manner to be more clearly described. Spaced inwardly from the edges of the scallops, is a plurality of seats 11, these seats being here shown in the form of rectangular openings, one opening being formed in the inner portion of each scallop as shown. It follows, that since the scallops of the two wheels are longitudinally alined, the seats or openings 11 will likewise be disposed in such alinement, in which position, they receive projections 12 formed on the ends of a plurality of pairs of eye-glasses 13 which are disposed between the outer edges of the two wheels as clearly disclosed in Fig. 2. When the glasses are so positioned in the machine, the numbers of the lenses with which they are equipped, are stamped upon the inner sides of the scallops 10 of one of the wheels 8 as shown in Fig. 4, it being therefore an easy matter to determine the correct number of the lenses required, by successively applying the eyes to the numerous pairs of glasses and by looking therethrough at an appropriate card or chart in rear of the machine. When the operator (the customer) discovers that a certain pair of glasses is suitable for his or her eyes, it is simply necessary to refer to the number opposite such pair of glasses, after which such customer may request a pair of glasses of this number from the optician. Furthermore, since the nose bridges 13ª of the spectacles or glasses 13 are of different sizes, it will be evident that the prospective buyer may locate a bridge of a size for properly fitting his or her nose. Then, by referring again to the numbers adjacent the pairs of glasses, the customer may give such number to the optician, thus designating the size of the bridge needed. By this method of testing the eyes, the purchaser of the glasses may be perfectly satisfied and the valuable time of the optician is not unnecessarily expended. Furthermore, although as above described, the device may be placed in the salesrooms of opticians, it may likewise be used to advantage in department stores and the like wherein no experienced opticians are employed, the customers being allowed to select the glasses which are found to most nearly fulfil the requirements. When so applied to use, it is obvious that when the proper pair of spectacles is selected by a prospective customer, the number of such pair appearing on the scallop adjacent the same, may be used when obtaining a duplicate of such glasses from the clerk.

In order that persons unfamiliar with the operation of the testing device may readily use the same, an appropriate card indicated at 20 is preferably positioned at the lower end of the front thereof, this card being inscribed fully with directions concerning the uses and manner of operation of the device.

From the foregoing description, taken in connection with the accompanying drawings, it will be seen that an extremely simple article has been provided for carrying out the object of the invention, yet that such article will be very efficient in operation.

I claim:—

1. An eye testing device comprising a pair of spaced axially alined rotatably mounted disks having their edges curved outwardly and scalloped to form individual circumferentially spaced pairs of head engaging flanges, each of said flanges being formed with an opening, and a plurality of pairs of eye glasses interposed between the two disks and having projections on their ends received in the aforesaid openings.

2. An eye testing device comprising a pair of spaced axially alined disks having their edges curved outwardly and scalloped to form individual circumferentially spaced pairs of head engaging flanges, each of said flanges being formed with an opening, a revolubly mounted shaft passing through the centers of the disks, inner and outer nuts threaded adjustably on said shaft and contacting respectively with the inner and outer sides of the disks, a plurality of pairs of eye glasses interposed between the two disks and having projections on their ends received in said openings, circumferentially spaced stay bolts parallel to the shaft and passing through the disks, and inner and outer nuts threaded adjustably on said stay bolts and contacting respectively with the inner and outer sides of the disks, whereby the distances between circumferentially spaced portions of the two disks may be varied to compensate for eye glasses having frames of different length.

In testimony whereof I have hereunto set my hand in presence of two subscribing witnesses.

AARON LEROY JONES.

Witnesses:
Mrs. J. R. PARKS,
CLIFFORD J. PARKS.

Copies of this patent may be obtained for five cents each, by addressing the "Commissioner of Patents, Washington, D. C."